May 30, 1944.    J. W. FITZ GERALD    2,350,276
ENGINE STARTER
Filed June 19, 1943    2 Sheets-Sheet 1

Inventor
John W. FitzGerald Deceased
By Mary C. FitzGerald Executrix
Attorney

May 30, 1944.    J. W. FITZ GERALD    2,350,276
ENGINE STARTER
Filed June 19, 1943    2 Sheets-Sheet 2

Inventor
John W. FitzGerald Deceased
By Mary C. FitzGerald Executrix
Attorney

Patented May 30, 1944

2,350,276

UNITED STATES PATENT OFFICE 2,350,276

ENGINE STARTER

John W. Fitz Gerald, deceased, late of Milwaukee, Wis., by Mary C. Fitz Gerald, executrix, Milwaukee, Wis., assignor to Briggs & Stratton Corporation, Milwaukee, Wis., a corporation of Delaware Application June 19, 1943, Serial No. 491,505

8 Claims. (Cl. 74—7)

This invention relates to engine starters of the so called automatic type wherein a pinion is automatically propelled to and from mesh with the ring gear of the engine during operation of the starter, and has particular reference to starters of this type which employ a resilient frictional driving connection consisting of an elastically deformable annulus confined between driving and driven parts as in United States Reissue Patent No. 20,686 issued to John W. Fitz Gerald April 5, 1938.

This elastic deformable annulus is generally made of rubber or some similar material and as such is subjected to the possibility of taking a permanent set due to its repeated deformation during operation.

The driving and driven parts of the yielding driving connection are held against endwise separation beyond a predetermined distance which at the time the starter leaves the factory is such that the rubber collar or annulus is held under a slight degree of endwise compression sufficient to obtain the necessary friction for initial torque transmission.

Hence, if the rubber takes a permanent set, this initial frictional engagement between the rubber annulus and the driving and driven parts is apt to be lost with the result that the starter no longer functions.

While this condition can be controlled to an extent by increasing the initial precompression of the rubber collar this has disadvantages. Moreover the unpredictableness of rubber as to its reaction in use would even then result in loss of initial torque transmission every so often.

It is, therefore, an object of this invention to provide a simple manner of augmenting the initial frictional drive in starters of this type to insure their successful operation at all times.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which.

Figure 1:
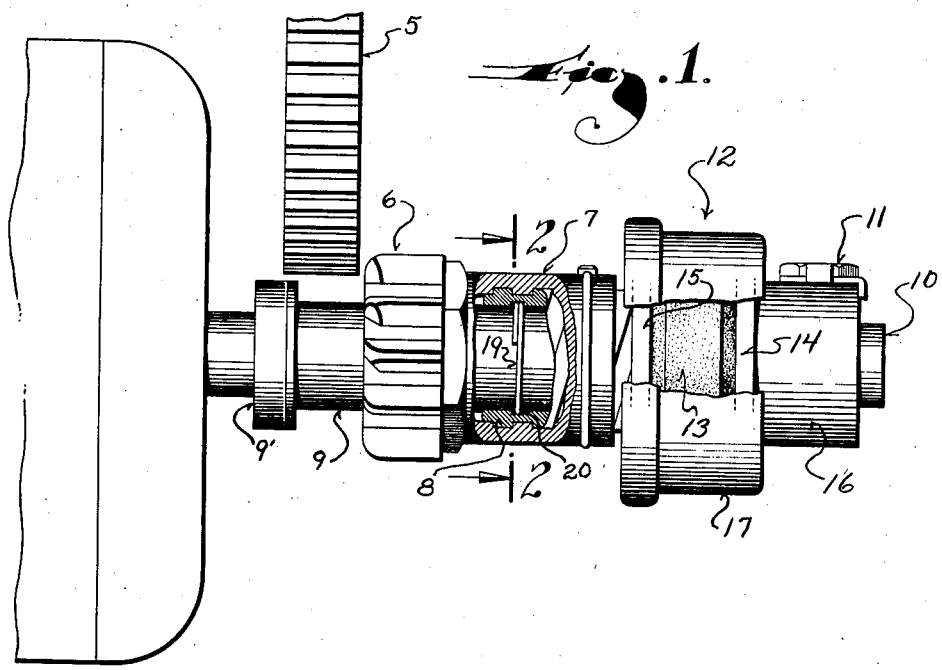
Figure 1 is a side view of a starter illustrating one application of this invention, parts thereof being broken away and in section.

Referring now more particularly to the accompanying drawings, in which like numerals indicate like parts, the numeral 5 designates the ring gear of an engine with which the pinion 6 of the starter is automatically meshed and demeshed during operation of the starter.

The pinion 6 is carried by or is part of an internally threaded sleeve 7 mounted on and threaded to a pinion actuating member 8 freely slidable and rotatable on a tube 9. The tube 9 is mounted on the shaft 10 of the starter motor to which it is drivingly secured by the set screw 11.

The forward end of the tube 9 carries the customary pinion stop 9' which limits forward propulsion of the pinion and thus defines its operative driving position in mesh with the ring gear.

By virtue of the threaded connection between the pinion sleeve 7 and the actuating member 8 relative rotation between these parts effects movement of the pinion to and from its operative driving position, and when the pinion is in its operative position engaging its stop 9' this threaded engagement transmits driving torque to the pinion.

Torque is yieldingly transmitted to the pinion actuating member through a driving connection indicated generally by the numeral 12 and comprising an annulus 13 of elastically deformable material such as rubber confined by driving and driven parts 14 and 15, respectively. The former is a flange on a collar 16 secured to the motor shaft 10 and the tube 9, and the latter is a flange on the pinion actuating member.

A shell 17 clinched to the flange 15 so as to be fixed thereto and having an inturned edge 18 overlying the flange 14 encases the rubber annulus and holds the driving and driven parts against separation.

The dimensions of the elements of the driving connection are such that during the assembly of the starter the rubber annulus is placed under a degree of precompression sufficient to establish an initial frictional driving connection between the rubber annulus and its cooperating driving and driven parts 14 and 15. In operation, after the pinion is in mesh with the ring gear, the threaded connection between the pinion and its actuator forces the actuator back against the rubber collar to increase the friction as the load is picked up.

Under ordinary circumstances this construction is entirely satisfactory, but in some instances the rubber annulus is apt to take a permanent set which so minimizes the initial friction between it and its driving and driven parts as to render the operation of the starter doubtful if not entirely impossible. To guard against this possibility an auxiliary frictional driving connection is provided between the power driven element and the pinion actuating member.

Figure 2:
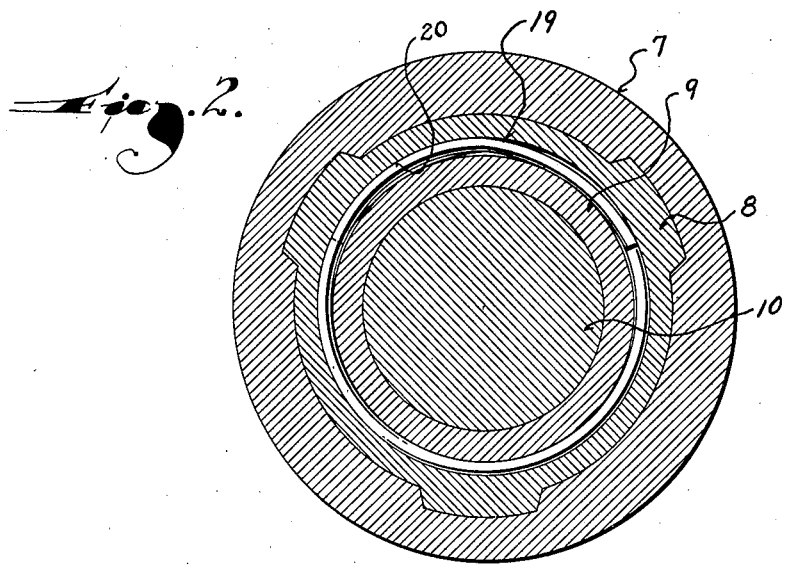
Figure 2 is a cross sectional view taken through Figure 1 on the plane of the line 2—2.

In the construction shown in Figure 1 this auxiliary driving connection is in the form of a spring ring 19 encircling the tube 9 within an annular groove 20 in the bore of the actuating member 8. The ends of this spring ring, as shown in Figure 2, are sprung slightly out of the true circular shape so that one end frictionally bears against the tube 9 while the other bears against the bottom of the annular groove 20.

Thus a frictional driving connection is established between the power driven tube 9 and the pinion actuating member.

The presence of this spring ring also serves as an oil seal to prevent the undesirable seepage of oil along the tube 9 to the rubber collar.

Figure 3:
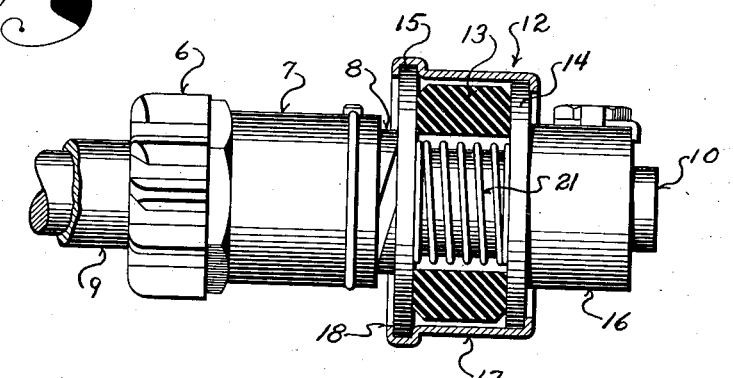
Figure 3 is a view in side elevation with parts broken away and in section illustrating another embodiment of this invention.

In Figure 3 the auxiliary driving connection consists of a coil spring 21 encircling the tube 9 between the driving and driven flanges 14 and 15. During assembly this spring is placed in compression so that its ends frictionally engage the driving and driven flanges. Hence, the spring establishes the desired torque transmission independently of the resilient driving connection 12.

Figure 4:
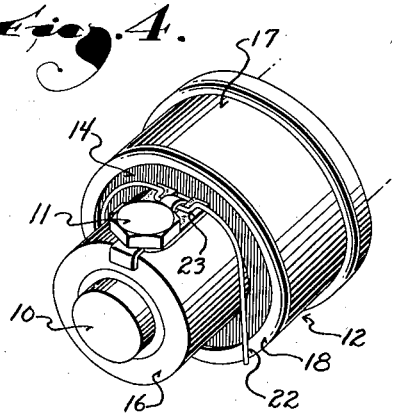
Figure 4 is a perspective view showing part of the starter and illustrating another application of this invention.
Figure 5:
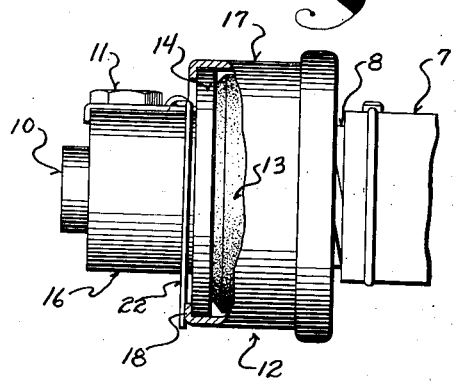
Figure 5 is a side view of the rear end portion of the starter shown in Figure 4 with parts broken away and in section.

Another manner of obtaining an auxiliary driving connection is shown in Figures 4 and 5 wherein a wire spring in the form of a U-shaped bail 22 has its closed end fastened to the driving element and its free ends bearing against the adjacent inturned edge 18 of the shell. To insure the desired frictional engagement the closed end of the spring has an offset portion 23 so disposed with respect to the plane of its free ends that when secured in place in the manner shown the free ends are forced toward the edge of the shell.

Figure 6:
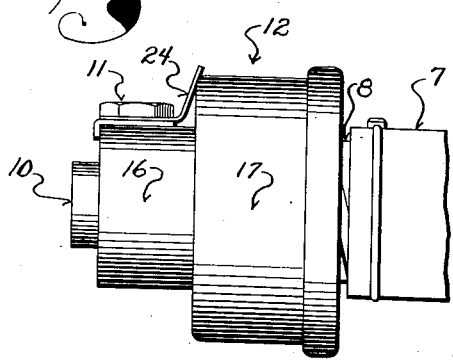
Figure 6 is a view similar to Figure 5 but illustrating another slightly modified form of the invention.

The same general concept also may be embodied in the form shown in Figure 6 wherein a flat leaf spring 24 confined under the head of the set screw has one end thereof bearing against the adjacent edge of the shell 17.

From the foregoing description taken in connection with the accompanying drawings, it will be readily apparent to those skilled in the art that this invention provides an exceedingly simple and effective manner of insuring the transmission of torque to the pinion actuating member notwithstanding the possibility of failure of the regular resilient driving connection due to its rubber collar having taken a permanent set.

What is claimed as the invention is:

1. In an engine starter of the type wherein a pinion is automatically actuated to move into and out of mesh with an engine gear: a rotatably mounted pinion actuating member; a positively driven driving member; a resilient driving connection between said members, said connection comprising cooperating frictionally engaged parts; and spring means establishing a frictional driving connection between said members in addition to said resilient connection for supplying an initial drive to the pinion actuating member in the event of inadequate initial friction between the cooperating parts of the resilient driving connection.

2. In an engine starter: a positively driven element; a pinion movable to and from an operative driving position; means for effecting movement of the pinion to its operative driving position through rotation of the positively driven element including a rotatable pinion actuating element; a driving connection between said elements comprising cooperating frictionally connected parts; and an auxiliary frictional driving connection between said elements entirely independent of said first named driving connection for establishing an initial drive transmission between said elements in the event of inadequate frictional engagement between the cooperating parts of said first named yielding driving connection.

3. In an engine starter: a motor driven driving element; a pinion actuating element adapted to be driven from said motor driven driving element; a resilient driving connection between said elements including an elastically deformable member and driving and driven parts frictionally engaged therewith; said resilient connection depending upon friction between said parts and the elastically deformable member for initial operativeness; and an auxiliary frictional driving connection between said elements to effect an initial drive transmission between said elements in the event of inadequate friction between said driving and driven parts and the elastically deformable member.

4. In an engine strarter: a drive shaft; a pinion member movable longitudinally and rotarily thereon; a pinion actuating member loose on the drive shaft; a threaded connection between the pinion actuating member and the pinion member whereby relative rotation between said members effects longitudinal movement of the pinion to and from its operative driving position; a driving connection between the pinion actuating member and the drive shaft requiring the presence of friction in its component parts for the transmission of driving torque to the actuating member; and an auxiliary frictional driving connection between the pinion actuating member and the drive shaft to transmit driving torque from the shaft to the actuating member in the event of inadequate initial friction in said first named driving connection.

5. In an engine starter of the type wherein a pinion is automatically propelled to and from an operative driving position: a drive shaft; a hollow screw shaft loosely mounted on the drive shaft and having a threaded connection with the pinion that relative rotation therebetween propels the pinion longitudinally to and from its operative driving position; a driving connection between the drive shaft and said hollow screw shaft including an elastically deformable member and driving and driven parts frictionally engaged therewith; and a spring member positively driven by the drive shaft and having frictional engagement with a part fixed with relation to the hollow screw shaft for transmitting torque to the hollow screw shaft in the event of inadequate friction in said driving connection.

6. In an engine starter of the type having a pinion movable automatically to and from its operative driving position; a power driven drive shaft; a pinion actuating member connected with the pinion and including, a sleeve loosely mounted on the power driven drive shaft; a driving connection between the power driven drive shaft and said pinion actuating member comprising driving and driven parts connected through an elastically deformable member with which said parts engage frictionally; and a coil spring encircling the drive shaft inside the sleeve of the actuating member and having frictional engagement with both so as to frictionally transmit torque from the drive shaft to the actuating member to augment the torque transmission through said driving connection.

7. In an engine starter of the type having a pinion automatically movable to and from an operative driving position: a power driven drive shaft; a pinion actuating member operatively connected with the pinion and loose on the drive shaft; a driving connection between the shaft and said actuating member comprising an elastically deformable member confined between driving and driven parts, the former being fixed with relation to the drive shaft and the latter being fixed with relation to the pinion actuating member; and a coil spring encircling the drive shaft between said parts and compressed therebetween so as to have frictional engagement therewith to frictionally transmit driving torque to the actuating member independently of said driving connection.

8. In an engine starter of the type wherein a pinion is automatically propelled to and from an operative driving position by relative rotation between it and a pinion actuating member: a resilient frictional driving connection through which torque is transmitted to the pinion actuating member comprising, a body of elastically deformable material confined between driving and driven parts, the latter being fixed with relation to the drive shaft; a housing for the elastically deformable member fixed with respect to the driven part; and a spring carried by the drive shaft and frictionally engaging said housing to transmit torque from the drive shaft to the housing and thus to said driven part independently of said resilient driving connection.

MARY C. FITZ GERALD,
*Executrix of the Estate of John W. Fitz Gerald, Deceased.*